(12) United States Patent
Wood et al.

(10) Patent No.: US 8,239,633 B2
(45) Date of Patent: Aug. 7, 2012

(54) NON-BROADCAST SIGNATURE-BASED TRANSACTIONAL MEMORY

(75) Inventors: David A. Wood, Madison, WI (US);
Mark D. Hill, Madison, WI (US);
Michael M. Swift, Madison, WI (US);
Michael R. Marty, Madison, WI (US);
Luke Yen, Fitchburg, WI (US); Kevin E. Moore, Mill Valley, CA (US); Jayaram Bobba, Madison, WI (US); Haris Volos, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 706 days.

(21) Appl. No.: 12/217,811

(22) Filed: Jul. 9, 2008

(65) Prior Publication Data

US 2009/0077329 A1 Mar. 19, 2009

Related U.S. Application Data

(60) Provisional application No. 60/949,097, filed on Jul. 11, 2007.

(51) Int. Cl.
*G06F 12/08* (2006.01)
(52) U.S. Cl. ................. 711/141; 711/E12.026
(58) Field of Classification Search .......... None
See application file for complete search history.

(56) References Cited

U.S. PATENT DOCUMENTS

| | | | |
|---|---|---|---|
| 5,930,833 A * | 7/1999 | Yoshioka et al. ......... | 711/210 |
| 5,951,657 A | 9/1999 | Wood et al. | |
| 6,557,080 B1 | 4/2003 | Burger et al. | |
| 6,883,070 B2 | 4/2005 | Martin et al. | |
| 6,981,097 B2 | 12/2005 | Martin et al. | |
| 2006/0085588 A1 * | 4/2006 | Rajwar et al. ............ | 711/100 |
| 2006/0101206 A1 | 5/2006 | Wood et al. | |
| 2007/0239943 A1 * | 10/2007 | Dice et al. ............... | 711/147 |
| 2009/0019209 A1 * | 1/2009 | Shen et al. ............... | 711/100 |

OTHER PUBLICATIONS

Kevin E. Moore, Mark D. Hill and David A. Wood. "Thread-Level Transactional Memory." Mar. 2005. Computer Sciences Dept., UW-Madison. TR-1524.*
Luis Ceze, James Tuck, Calin Cascaval, and Josep Torrellas. "Bulk Disambiguation of Speculative Threads in Multiprocessors." Jun. 2006. IEEE. ISCA'06.*
Kevin E. Moore, Jayaram Bobba, Michelle J. Moravan, Mark D. Hill, and David A. Wood. "LogTM: Log-based Transactional Memory." Feb. 2006. IEEE. HPCA'06.*
Ravi Rajwar, Maurice Herlihy, and Konrad Lai. "Virtualizing Transactional Memory." Jun. 2005. IEEE. ISCA'05.*
Dave Dice, Ori Shalev, and Nir Shavit. "Transactional Locking II." Sep. 2006. Springer Berlin. DISC'06.*
Ben Catanzaro. Multiprocessor System Architectures. 1994. SunSoft Press. pp. 51-52 and 84-85.*

(Continued)

*Primary Examiner* — Kevin L. Ellis
*Assistant Examiner* — Nathan N Sadler
(74) *Attorney, Agent, or Firm* — Shumaker & Sieffert, P.A.

(57) ABSTRACT

A coherence controller in hardware of an apparatus in an example detects conflicts on coherence requests through direct, non-broadcast employment of signatures that: summarize read-sets and write-sets of memory transactions; and provide false positives but no false negatives for the conflicts on the coherence requests. The signatures comprise fixed-size representations of a substantially arbitrary set of addresses for the read-sets and the write-sets of the memory transactions.

22 Claims, 4 Drawing Sheets

OTHER PUBLICATIONS

Swift et al., "OS Support for Virtualizing Hardware Transactional Memory", Feb. 2008, University of Wisconsin-Madison, pp. 1-10.

Yen et al., "LogTM-SE: Decoupling Hardware Transactional Memory from Caches", Feb. 2007, Department of Computer Sciences, University of Wisconsin-Madison, pp. 1-12.

* cited by examiner

NON-BROADCAST SIGNATURE-BASED TRANSACTIONAL MEMORY

STATEMENT OF GOVERNMENT RIGHTS

This invention was made with United States government support awarded by the following agency:
NSF 0205286 and 0324878
The United States government has certain rights to this invention.

BACKGROUND

Multiple threads of execution in a computer system allow a program to fork or split into independent concurrently running tasks. Multithreading as a programming and execution model allows multiple threads to exist within the context of a single process, sharing resources with independent and concurrent execution. Threads in the same program or process share memory and some other resources. Threads within different processes may be prevented from sharing memory or other resources.

A challenge in writing multithreaded programs is ensuring consistent access to data. If two threads concurrently access the same variables, one thread may see the intermediate results of another thread's operation. One approach employs locks coupled with careful programming to ensure that only one thread accesses shared data at a time. Improper use of locks can lead to deadlock or poor performance.

Transactional memory ("TM") promises to simplify multithreaded programming. A transaction may execute a series of reads and writes to shared memory. Transactions provide mutual exclusion of threads from a resource without the program deadlocking, and without reliance on assignment of locks to data structures.

A TM approach may effectively use the threads offered by chips with multiple cores and/or multi-threaded cores. A TM system lets a programmer invoke a transaction and rely on the system to make its execution appear atomic (e.g., all or nothing) and isolated (e.g., no intermediate states are visible). A successful transaction commits, while an unsuccessful one that conflicts with a concurrent transaction aborts or stalls. Some TM systems operate completely in software as software transactional memory ("STM") systems. Another implementation employs hardware support and comprises a hardware transactional memory ("HTM") system.

Hardware serves to accelerate transactional memory with desirable capabilities. Hardware provides isolation with conflict detection. The hardware detects conflicts among transactions by recording the read-set (addresses read) and write-set (addresses written) of a transaction. A conflict occurs when an address appears in the write-set of two concurrent transactions or the write-set of one and the read-set of another. Hardware provides atomicity with version management. Hardware stores both the new and old values of memory written by a transaction, so that the side effects of a transaction can be reversed.

Some implementations of HTMs make demands on L1 cache structures, for example, read/write (R/W) bits for read-set and write-set tracking, flash clear operations at commits/aborts, and write buffers for speculative data. Some implementations of HTMs depend on broadcast coherence protocols that preclude implementation on directory-based systems.

An HTM referred to as LogTM decouples version management from L1 cache tags and arrays. With LogTM, a transactional thread saves the old value of a block in a per-thread log and writes the new value in place (eager version management). LogTM's version management uses cacheable virtual memory that is not tied to a processor or cache. LogTM does not force writebacks to cache speculative data, because LogTM does not exploit cache incoherence, for example, where the L1 cache holds new transactional values and the L2 holds the old versions. Instead, caches are free to replace or write back blocks at any time. No data moves on commit, because new versions are in place, but on abort a software handler walks the log to restore old versions. LogTM does not decouple conflict detection, because LogTM maintains R/W bits in the L1 cache.

An HTM referred to as Bulk decouples conflict detection by recording read-sets and write-sets in a hashed signature separate from L1 cache tags and arrays. A simple 1K-bit signature might logically OR the decoded ten least-significant bits of block addresses. On transaction commit, Bulk broadcasts the write signature and all other active transactions compare the write signature against their own read and write signatures. A non-null intersection indicates a conflict, triggering an abort. Due to aliasing, non-null signature intersection may occur even when no actual conflict exists (a false positive) but no conflicts are missed (no false negatives). Bulk's support of multi-threading and/or nested transactions through replication of signatures avoids use of L1 structures.

Bulk does not decouple version management from the L1 cache. The cache controller performs writeback of committed but modified blocks before making speculative updates. The cache controller saves speculatively modified blocks in a special buffer on cache overflow. The cache controller allows only a single thread of a multi-threaded processor to have speculative blocks in any single L1 cache set. Bulk depends on broadcast coherence for atomicity. Bulk employs global synchronization for ordering commit operations.

Application programmers reason about threads and virtual memory, while hardware implements multi-threaded cores, caches, and physical memory. Operating systems (OSes) provide programmers with a higher-level abstraction by virtualizing physical resource constraints, such as memory size and processor speed, using mechanisms such as paging and context switching. To present application programmers an abstraction of transactional memory, the OS (1) ensures that transactions execute correctly when it virtualizes the processor or memory, and (2) virtualizes the HTM's physical resource limits. In cache victimization, caches may need to evict transactional blocks when a transaction's data size exceeds cache capacity or associativity. Multi-threaded cores make this more likely and unpredictable, due to interference between threads sharing the same L1 cache.

Operating systems use thread suspension and migration to increase processing efficiency and responsiveness by suspending threads and rescheduling them on any thread context in the system. To support thread context switch and migration, the OS removes all of a thread's state from its thread context, stores it in memory, and loads it back, possibly on a different thread context on the same or a different core. For HTMs that rely on the cache for either version management or conflict detection, moving thread state is difficult because the transactional state of a thread may not be visible to the operating system. In addition, with a non-broadcast coherence protocol, coherence messages may not reach the thread at its new processor.

DESCRIPTION OF THE DRAWINGS

Features of exemplary implementations of the invention will become apparent from the description, the claims, and the accompanying drawings in which:

DETAILED DESCRIPTION

Figure 1:
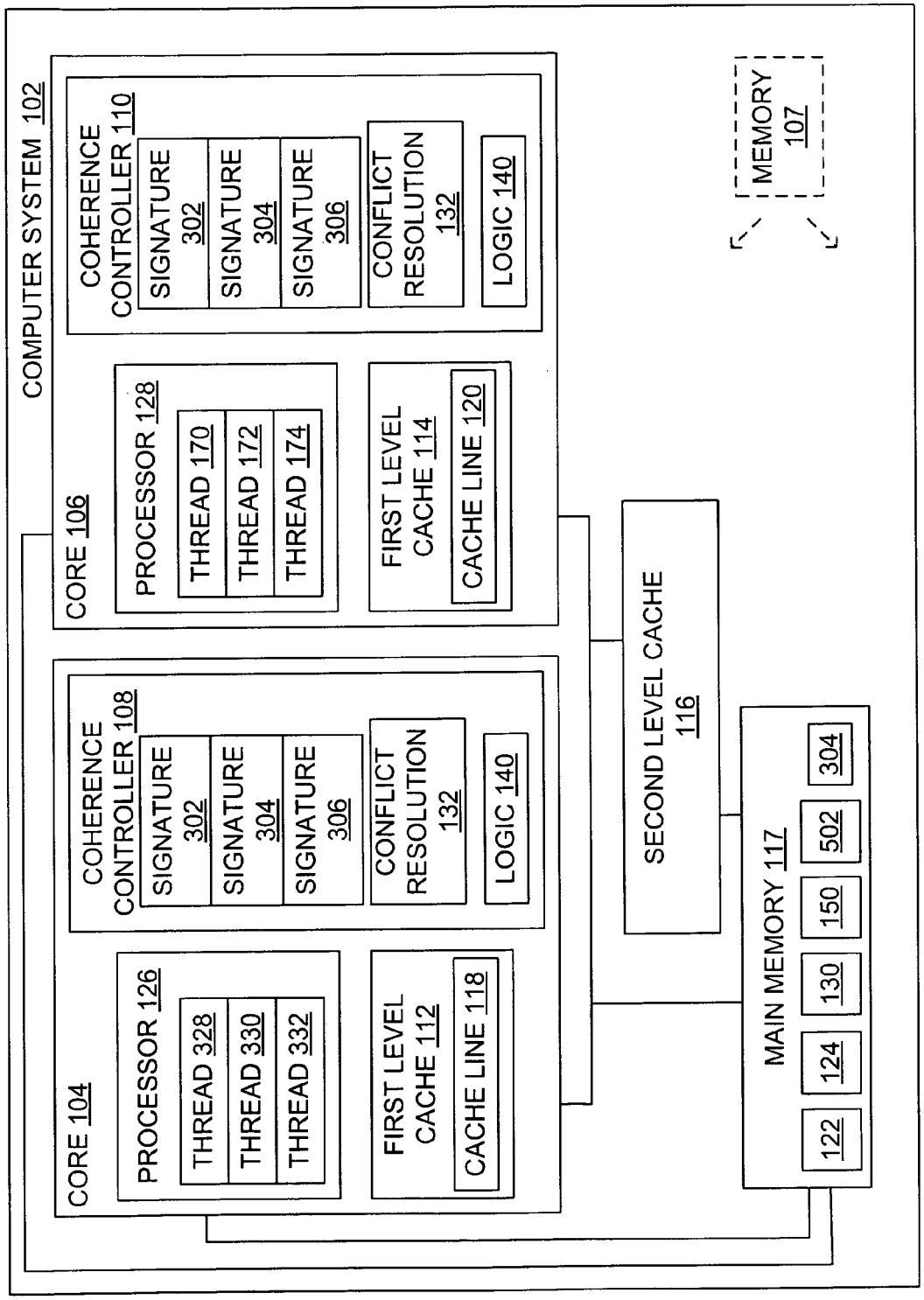
FIG. 1 is a representation of an implementation of an apparatus that comprises a plurality of cores, one or more second level (L2) memories and/or caches, a memory, and/or a main memory.

Referring to the BACKGROUND section above, an exemplary hardware transactional memory ("HTM") system decouples version management and conflict detection from the L1 cache tags and arrays. The L1 cache may be viewed as significant in the design of high performance processors and better left untouched by transactional memory. A desire to support both multi-threaded processors with T threads per processor and nesting L levels deep leads to T×L copies of the state that may be better handled decoupled from the L1 cache. Having transactional state non-integrated with the L1 cache promotes saving and restoration for virtualization of transactional memory, for example, supporting cache victimization, unbounded nesting, thread suspension/migration, and paging.

An exemplary implementation comprises a hardware transactional memory (HTM) system called LogTM Signature Edition (LogTM-SE). LogTM-SE decouples both conflict detection and version management from L1 tags and arrays. LogTM-SE combines and adapts Bulk's signatures and LogTM's log to reap synergistic benefits. With LogTM-SE, transactional threads record read-sets and write-sets with signatures and detect conflicts on coherence requests. For example, the transactional threads employ and/or operate one or more coherence controllers to perform conflict detection. A transaction in an example comprises a memory transaction in contrast to a database transaction and/or other types of transactions.

Transactional threads update memory in place after saving the old value in a per-thread memory log. LogTM-SE does not depend on broadcast coherence protocols. A transaction commits locally by clearing its signature and resetting its log pointer. LogTM-SE need not employ commit tokens, data writebacks, or broadcast. Aborts locally restore old values from the log.

Transactions in LogTM-SE are virtualizable, for example, they may be arbitrarily long and can survive operating system (OS) activities such as context switching and paging, because the structures that hold their state are software accessible and because LogTM-SE provides a mechanism for enforcing transaction semantics for transactions affected by OS activities. Both old and new versions of memory can be victimized transparently because the cache holds no inaccessible transactional state. The ability to save and restore signatures allows unbounded nesting. LogTM-SE enables context switching threads executing transactions and swapping or relocating pages that comprise data accessed by a transaction with an additional summary signature per thread context to summarize descheduled transactions and transactions affected by paging.

LogTM-SE virtualizes a transaction with summary signatures, which makes available, or alleviates or removes employment of, hardware resources for the transaction. LogTM-SE supports paging by protecting remapped transactional data at their new address with summary signatures. In a further example, LogTM-SE can maintain a virtual signature that tracks read and write sets by virtual instead of physical addresses to simplify paging.

A simulated transactional chip multiprocessor (CMP) has indicated that LogTM-SE performs comparably with the less-virtualizable, original LogTM. For sample workloads, even very small (e.g., 64 bit) signatures perform comparably to or better than locking. LogTM-SE contributes an HTM design that (1) leaves L1 cache state, tag, and data arrays unchanged (no use of in-cache R/W bits or transactional write buffers), (2) has no dependence on a broadcast coherence protocol, (3) effectively supports systems with multi-threaded cores (replicating small signatures) on one or more chips (with local commit), and (4) supports virtualization extensions for victimization, nesting, paging, and context switching because signatures are easily copied.

An exemplary implementation employs hardware or software to perform version management and conflict resolution.

LogTM-SE uses signatures to summarize a transaction's read-set and write-set and detects conflicts on coherence requests (eager conflict detection). Transactions update memory "in place" after saving the old value in a per-thread memory log (eager version management). A transaction commits locally by clearing its signature, resetting the log pointer, etc., while aborts undo the log. A transaction in an example comprises a memory transaction in contrast to a database transaction and/or other types of transactions.

LogTM-SE provides benefits. For example, signatures and logs can be implemented without changes to highly-optimized cache arrays because LogTM-SE need not move cached data, change a block's cache state, or flash clear bits in the cache. As another example, transactions may be more easily virtualized because signatures and logs are software accessible, allowing the operating system at runtime to save and restore this state. LogTM-SE allows cache victimization, unbounded nesting (both open and closed), thread context switching and migration, and paging. An exemplary implementation of LogTM-SE makes no changes to the L1 caches and lacks structures that explicitly limit transaction size.

Turning to FIG. 1, an implementation of an apparatus 100 comprises a computer system 102. The computer system 102 may comprise one or more of a plurality of cores 104, 106, one or more second level (L2) memories and/or caches 116, a memory 107, and/or a main memory 117. The cores 104, 106 may comprise a plurality of processors 126, 128, a plurality of coherence controllers 108, 110, and a plurality of first level (L1) memories and/or caches 112, 114. The processors 126, 128 in an example comprise central processing units (CPUs) and/or single or and/or multi-threaded processing units. One or more threads 328, 330, 332, 170, 172, 174 in an example may run on the processor 126, 128. The core 104, 106 may be responsible for logging and version management.

The memory 107 in an example comprises the main memory 117 and a plurality of levels of memory and/or a plurality of levels of caches. The coherence controller 108, 110 comprises hardware implementation of an algorithm, procedure, program, process, mechanism, engine, model, coordinator, module, application, code, and/or logic. Directory memory state 130 is located in the main memory 117.

The memory 107 in an example comprises the first level cache memories 112, 114, the second level cache memory 116, and the main memory 117. In another example, the memory 107 may comprise additional levels of cache such as third or fourth levels of cache 112, 114, 116 as will be appreciated by those skilled in the art. An exemplary implementation of cache comprises a memory that is not separately and/or independently addressable. The memory 107 in an example comprises a union or combination of the caches 112, 114, 116 and the main memory 117. The caches 112, 114, 116 and the main memory 117 in an example serve to identify and/or specify the exact storage location for an item of data. Together, the caches 112, 116 and the main memory 117 present an abstraction of a unified memory to programmers as the memory 107. Also, the caches 114, 116 and the main memory 117 present the abstraction of the unified memory to programmers as the memory 107. An operating system (OS) 124 resides in this unified memory as the memory 107. One or more contention managers 122 may be integral with or distinct from the OS 124 in the memory 107. Software 150 may be located in the memory 107. The contention manager 122 and/or the software 150 in an example comprise a software implementation of an algorithm, procedure, program, process, mechanism, engine, model, coordinator, module, application, code, and/or logic.

The coherence controller 108 serves to allow the core 104 to access memories 112, 114, 116, 117. The coherence controller 108 in an example is accessed by the processor 126 on all loads and stores, and by the first level cache 112 on all coherence requests from or to the cache 112. In an example, the core 104 comprises the coherence controller 108. In another example, the first level memory 112 comprises the coherence controller 108. In a further example, the coherence controller 108 comprises an interface between the core 104 and one or more of the memories 112, 114, 116, 117.

Figure 2:
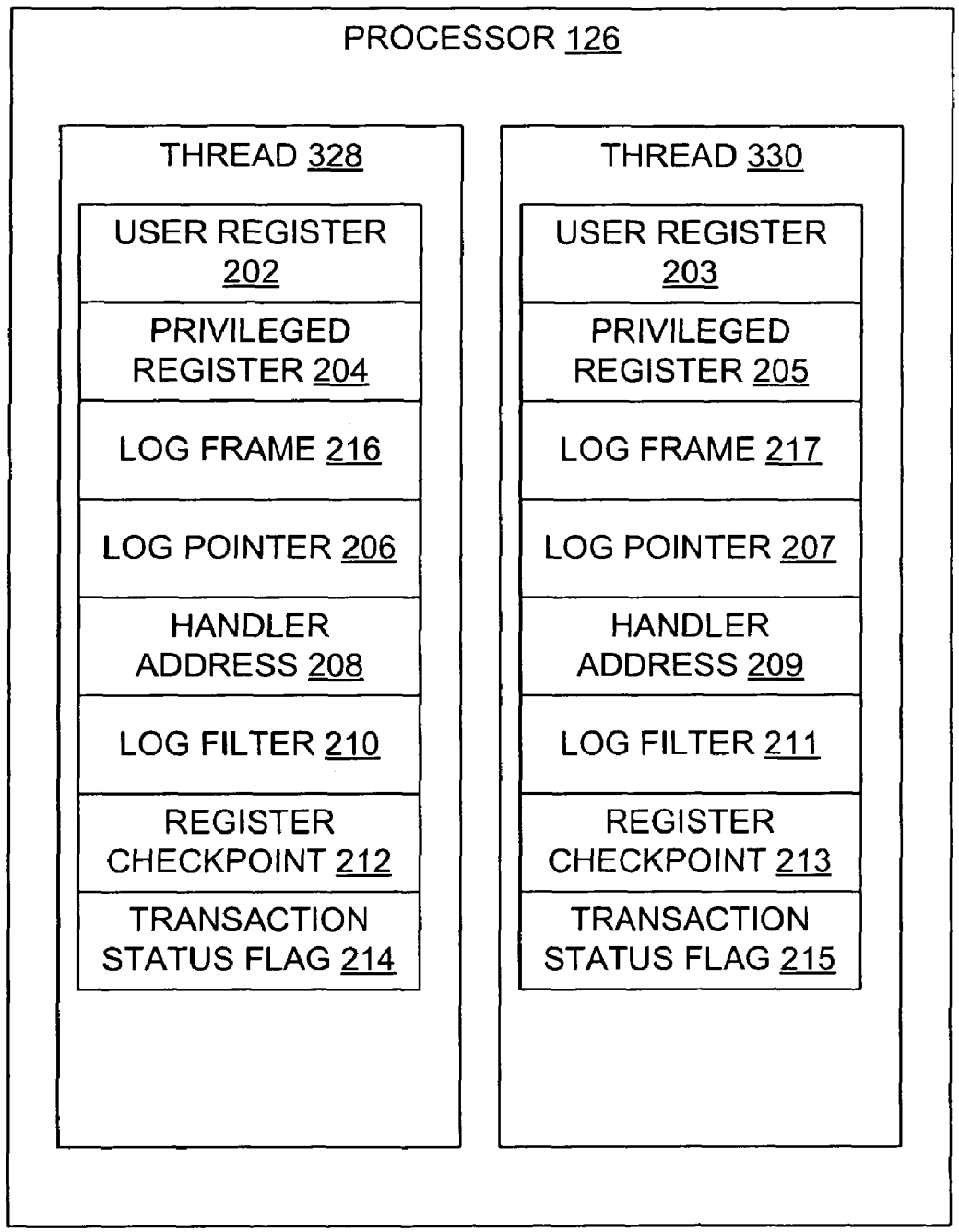
FIG. 2 is a representation of a plurality of threads on a processor of an implementation of a core of the apparatus of FIG. 1.

Turning to FIG. 2, the processor 126, which may be single or multi threaded, comprises for each thread 328, 330 a plurality of user registers 202, 203, a plurality of privileged registers 204, 205, and state for controlling transactions, for example, a log pointer 206, 207, a handler address 208, 209, a log filter 210, 211, a register checkpoint 212, 213, a transaction status flag 214, 215, and a log frame register 216, 217. The log pointer 206, 207 comprises an address of a transaction log 401 (FIG. 4) in virtual memory. The transaction status flag 214, 215 serves to identify whether transactions have been affected by OS and/or virtual machine actions to virtualize the processor or memory. The log frame register 216, 17 serves to identify the base of the most inner-most nested transaction. The transactional state in the processor 126, 128 of the core 104, 106 serves to implement transaction version management.

Figure 3:
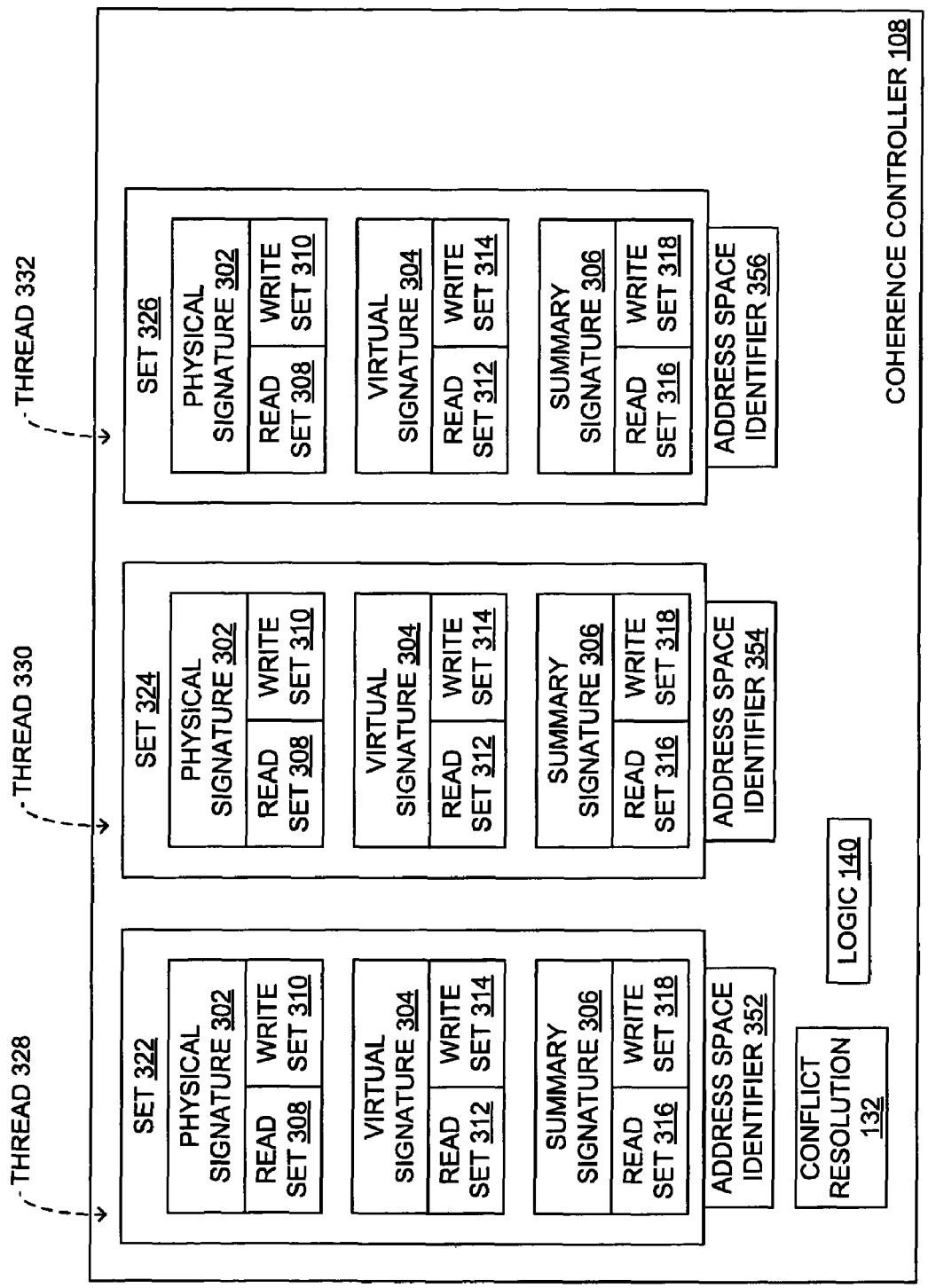
FIG. 3 is a representation of a coherence controller on an implementation of a core of the apparatus of FIG. 1.

Turning to FIG. 3, the coherence controller 108 in an example comprises one or more signatures such as one or more of a physical signature 302, a virtual signature 304, and/or a summary signature 306; one or more sets 322, 324, 326 of the signatures 302, 304, 306 such as for respective threads 328, 330, 332 on a multithreaded core as the core 104; address space identifiers 352, 354, 356 associated with the sets 322, 324, 326, respectively; conflict resolution logic 132; and/or logic 140. The logic 140 in an example comprises state and logic that serve to implement a cache coherence protocol, as will be appreciated by those skilled in the art.

The coherence controller 108 serves to detect conflicts on coherence requests through direct, non-broadcast employment of the physical signature 302, the virtual signature 304, and/or the summary signature 306. The coherence controller 108 consults the physical signature 302 directly on coherence requests, and relies on the coherence protocol to direct requests to the appropriate additional controllers 108, 110 in the computer system 102. Coherence requests in an example comprise messages sent over a connection network from one coherence controller 108 to another to request access to the contents of the memory 107. The coherence controller 108, 110 in an example operates a state machine for each cache line 118, 120. The coherence protocol implemented by the logic 140 in an example defines which messages should be sent based on the memory request from a core 104, 106, the state of a cache line 118, 120, and how the state of a cache line 118, 120 changes based on coherence requests sent and received.

The coherence controller 108 consults the summary signature 306 on program loads and stores. The signatures comprise corresponding read-sets (addresses read) and write-sets (addresses written) of transactions. A transaction in an example comprises a memory transaction in contrast to a database transaction and/or other types of transactions. The physical signature 302 comprises read-set 308 and write-set 310. The virtual signature 304 comprises read-set 312 and write-set 314. The summary signature 306 comprises read-set 316 and write-set 318.

The coherence controller 108 in an example creates the physical signature 302 and the virtual signature 304. On all loads and stores within a transaction, the coherence controller 108 adds the physical address of the load or store to a physical signature 302 and the virtual address of the request to the virtual signature 304. The summary signature 306 is created in software 124, 150 or by the coherence controller 108 at the direction of software 124, 150. For example, a simple 1K-bit read-set signature might result from a logical OR of the decoded ten least-significant bits of block addresses read. In a further example, a simple 1K-bit write-set signature might result from a logical OR of the decoded ten least-significant bits of block addresses written. An implementation may employ more complicated hash functions to determine the encoding of addresses into signatures.

The physical signature 302, the virtual signature 304, and the summary signature 306 serve to summarize read-sets and write-sets of transactions and provide false positives but no false negatives for the conflicts on the coherence requests. The physical signature 302, the virtual signature 304, and the summary signature 306 comprise fixed-size representations of an arbitrary and/or substantially arbitrary set of addresses for the read-sets and the write-sets of the transactions. The addresses in an example can be relatively large, relatively small, and/or any selected and/or variable number in between. In a further example, the addresses represented by the physical signature 302, the virtual signature 304, and the summary signature 306 may comprise a discontiguous set of all possible addresses, for example, if transactional behavior is not desired for all memory.

The coherence controller 108 in an example computes the physical signature 302 and the virtual signature 304. The coherence controller 108 may assist in computing the summary signature 306. The physical signature 302 may be computed as a function of physical addresses, for example, after address translation. The virtual signature 304, where present in an exemplary implementation, may be computed from virtual addresses. The summary signature 306 may be computed from the physical signature 302 or the virtual signature 304. The summary signature 304 may computed at the direction of software 124, 150 that identifies the addresses or sets of addresses to include, or may be computed in hardware such as by the coherence controller 108. In addition, the summary signature may be computed completely in software and then loaded into hardware.

For each thread context for threads such as threads 328, 330, 332 on a multithreaded core as the core 104, the core 104 maintains a respective signature 306 that summarizes read-sets 316 and write-sets 318 of the transactions of a corresponding thread 328, 330, 332.

The coherence controller 108, 110 and the same multithreaded core as the core 104, 106 are integrated or distinct, for example, but closely coupled. Loads or stores to memory blocks by each thread on the same multithreaded core 104, 106 cause requests to the coherence controller 108, 110, that cause them to query the signatures 302, 304, 306 associated with the memory blocks in the memory 112, 114 for the corresponding read-sets 308, 312, 316 and write-sets 310, 314, 318 of the transactions of all other threads on the same multithreaded core 104, 106. Software 124, 150 can store the signatures 302, 304, 306 to memory 112, 114 and load the signatures 302, 304, 306 from the memory 112, 114.

The physical signature 302, the virtual signature 304, and/or the summary signature 306 comprise hash functions as probabilistic data structures. The coherence controller 108 detects the conflicts on the coherence requests through direct, non-broadcast employment of the hash functions. The physical signature 302, the virtual signature 304, and the summary signature 306 in an example comprise and/or resemble Bloom filters as probabilistic data structures. The coherence controller 108 detects the conflicts on the coherence requests through employment of the Bloom filters, or approximations of the Bloom filters.

The coherence controller 108 is in hardware and detects conflicts on coherence requests through direct, non-broadcast employment of the physical signature 302, the virtual signature 304, and/or the summary signature 306. The physical signature 302, the virtual signature 304, and/or the summary signature 306 summarize read-sets and write-sets of transactions. The physical signature 302, the virtual signature 304, and/or the summary signature 306 provide false positives but no false negatives for the conflicts on the coherence requests. The physical signature 302, the virtual signature 304, and/or the summary signature 306 comprise fixed-size representations of a substantially arbitrary set of addresses for the read-sets and the write-sets of the transactions.

Figure 4:
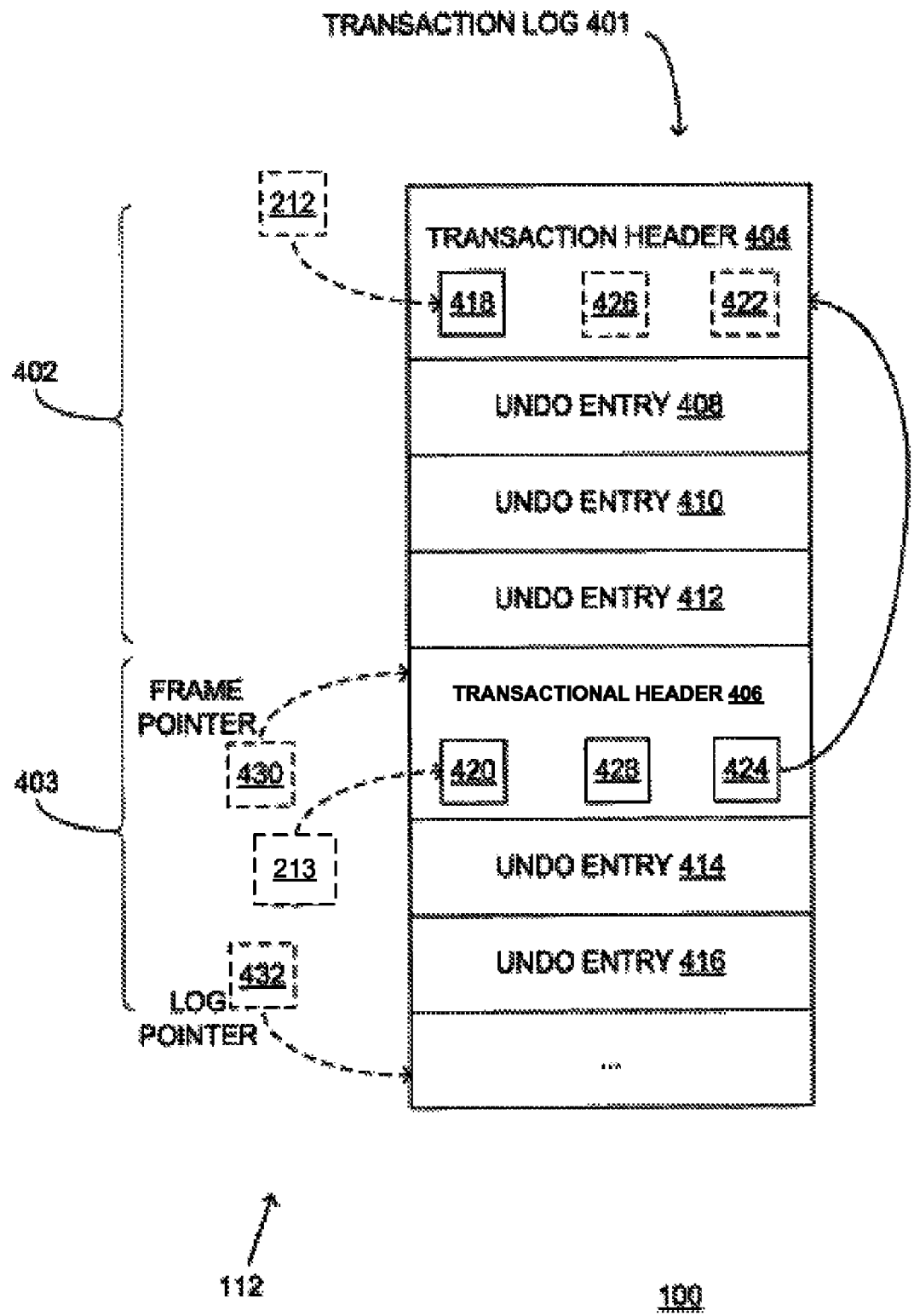
FIG. 4 is a representation of a transaction log that may be located in a cache memory of an implementation of the apparatus of FIG. 1 and illustrates a plurality of log frames.

Turning to FIG. 4, the transaction log 401 is addressed virtually and is located in memory 107, but accessed through the first level cache memory 112. The transaction log 401 comprises one or more log frames 402, 403. The log frames 402, 403 comprise transaction headers 404, 406 and one or more corresponding undo entries 408, 410, 412, 414, 416. For example, the transaction header 404 of the log frame 402 may correspond to a first transaction, and the transaction header 406 of the log frame 403 may correspond to a second transaction that is nested relative to the first transaction. Additional transaction headers 404, 406 may mark the respective beginnings of more undo entries 408, 410, 412, 414, 416 for additionally-nested transactions.

The transaction headers 404, 406 may comprise register checkpoints 418, 420, last-frame pointers 422, 424, and signature snapshots 426, 428. The register checkpoints 418, 420 correspond to the register checkpoints 212, 213 of corresponding cores 104, 106. The coherence controller 108 copies the checkpoint 212 to the log register checkpoints 418, 420 when beginning a nested transaction (a sub-transaction within a parent transaction). At transaction begin, the processor 126 allocates a new log frame 402.

For example, if the transaction is a top-level transaction, the log frame 402 is initialized to empty. If the transaction is a nested transaction, the processor 126 initializes the log frame 402 with the thread's current register checkpoint 212, a snapshot 426, 428 of the physical 302 and virtual 304 signatures, and the current log frame pointer 430 (the base of the parent's frame), and then sets the log frame pointer 430 to the new frame. New undo entries 408, 410 are written to the end of the log 401, and the log pointer 432 is incremented. The processor 126 stores a two-bit tag in each log record, indicating whether it is an undo entry 408 or transaction header 404. The undo entries 408, 410, 412, 414, 416 each comprise a virtual address and the old contents of that virtual address.

Where a log frame 402 is at the front of the transaction log 401, the last-frame pointer 422 and the snapshot 426 may be omitted or comprise a zero or null value since no other log frame would precede the log frame 402 at the front. For example, the snapshot 428 for the nested log frame 403 records the values of the physical signature 302 and the virtual signature 304 at the beginning of the associated transaction. The snapshot 428 in an example comprises the binary number 01001000 as the physical signature 302 at the beginning of the associated transaction and the binary number 01010010 as the virtual signature 304 at the beginning of the associated transaction.

An illustrative description of exemplary virtualization of a transaction is now presented, for explanatory purposes.

Referring to FIG. 1, an example presents a suspension of one of the threads while other threads run. A plurality of threads such as suspended thread 502, and running threads 328 and 170 are present. The running thread 328 runs on the core 104 and the running thread 170 runs on the core 106. The suspended thread 502 had previously run on the core 104 but was suspended by the operating system 124.

The running thread 328 has associated instances of the physical signature 302, the virtual signature 304, and the summary signature 306. The running thread 170 has associated instances of the physical signature 302, the virtual signature 304, and the summary signature 306.

The suspended thread 502 has saved a value for an associated instance of the virtual signature 304 in the main memory 117. The running threads 328 and 170 load as their summary signatures 306 a value equal to the virtual signature 304 associated with the suspended thread 502. The virtual signature 304 of the suspended thread 502 and therefore the summary signatures 306 of the running threads 328 and 170 in an example comprise the binary number 1011. Whenever the thread 170 makes a memory reference, the coherence controller 110 checks its summary signature 306 before either returning memory from cache 114 or issuing a coherence request to another core such as the core 104.

The threads 328, 502, 170 in an example consult and/or employ the coherence controller 108 on coherence requests and on all program loads and stores. For example, this may allows the coherence controller 108 to construct the physical signature 302 and the virtual signature 304. At the same time in an example the coherence controller 108 can check the summary signature 306.

The coherence controller 108 in an example tracks read-sets and write-sets with signatures, for example, conservative signatures and/or conservatively encoded sets. A signature implements several operations. Let OPERATION O be a read or a write and ADDRESS A be a block-aligned physical address. INSERT(O, A) adds A to the signature's O-set. Every load instruction invokes INSERT(read, A) and every store invokes INSERT(write, A). CONFLICT(read, A) returns whether A may be in a signature's write-set and, therefore, whether there may be a conflict with a read to A. CONFLICT(write, A) returns whether A may be in a signature's read-set or write-set. Both tests may return false positives (report a conflict when none existed), but will not have false negatives (fail to report a conflict). Finally, CLEAR(O) clears a signature's O-set.

The coherence controller 108 in an example only invokes INSERT on the virtual signature 304, to create a record of the read and write sets of a running transaction with virtual addresses. The coherence controller 108 in an example only invokes CONFLICT on the summary signature 306, to check for conflicts against transactions impacted by OS virtualization. The coherence controller 108 in an example invokes both INSERT and CONFLICT on the physical signature 302 to detect conflicts among running transactions. To INSERT, on every load by a thread 328, 330 in an example the coherence controller 108 hashes the physical address of the memory block accessed by the load and adds it to the physical read signature 308 and also hashes the virtual address of the memory block and adds it to the virtual read signature 312. On every store by a thread 328, 330 in an example the coherence controller 108 hashes the physical address of the memory block accessed by the load and adds it to the physical write signature 310 and also hashes the virtual address of the memory block and adds it to the virtual write signature 314. To check conflicts with the summary signature, the coherence controller 108 in an example checks the summary signature 306 on every memory request by a thread 328, 330, 332 on the core 104. On loads, the coherence controller 108 checks the summary write signature 318 and on stores the coherence controller 108 checks both summary read signature 316 and write signature 318

An exemplary LogTM-SE coherence controller 108 employs signatures for eager conflict detection. LogTM-SE may be appreciated to perform eager conflict detection like LogTM, except that LogTM-SE uses signatures 302, 304, 306 in the coherence controller 108 (not read/write bits in the L1 caches such as memories 112, 114) and handles multi-threaded cores as the cores 104, 106.

For explanatory purposes, one may consider conflict detection with single-threaded cores as the cores 104, 106. A load (store) from the core 106 that misses to block A generates a GETS(A) (GETM(A)) coherence request. A core 104 that receives a GETS (GETM) request checks its read and/or write signatures, as the read-set 308 and write-set 310 of the physical signature 302, using a CONFLICT(read, A) (CONFLICT (write, A)) operation. A core 104 that detects a possible conflict responds with a negative acknowledgement (NACK). The requesting core 106, seeing the NACK, then resolves the conflict.

LogTM-SE in an example adopts LogTM's conflict resolution mechanism. The coherence controller 108 may stall the memory request and retry the coherence operation. If the coherence controller 108 detects that a deadlock cycle is present, the coherence controller 108 will indicate to the core 106 that the transaction should be aborted. The core 106 in an example raises a trap to the contention manager 122 for the thread and/or process, located at the handler address 208, which handles the abort and provides additional policies for resolving conflicts. The core may set a flag in the transaction status flag 214 indicating the cause of the trap. In another example, a conflict resolution mechanism on the core 104 may trap to the contention manager 122 without first stalling or retrying in hardware. The contention manager 122 resolves conflicts by selecting a transaction to abort based on a programmer specific policy, for example the oldest or youngest conflicting transaction. The contention manager 122 may resolve conflicts based on available data about the conflicting transactions, such as their age, size, or priority.

A load or store that misses to a memory block in the first level memory 112, 114 generates a coherence request. The coherence controller 108, 110 receives the coherence request and checks the signatures 302 for a conflict. Upon a determination of the conflict, the coherence controller 108, 110 provides an indication of the conflict that is employable by conflict resolution logic 132 on the core 104, 106. The conflict resolution logic 132 may send a negative acknowledgement (NACK) back to the requesting core. The coherence controller 108, 110 may also invoke the conflict resolution logic 132, for example, when detecting a conflict and/or when receiving a NACK coherence message. The coherence controller 108, 110 and the conflict resolution logic are integrated or distinct. The conflict resolution logic 132 may choose to resolve the conflict in hardware, by stalling, or may trap the software contention manager 122. The coherence controller 108 may detect possible deadlocks with the conflict resolution logic 132 and trap to software 124, 150.

The coherence controller 108, 110 performs eager conflict detection. The coherence controller 108, 110 identifies a conflict: upon arrival at the coherence controller 108, 110 of any coherence request from a second transaction that is in the write-set 310, 314, 318 of a first transaction; and/or upon arrival at the coherence controller 108, 110 of a coherence GETM (write) request from the second transaction that is in the read-set 308, 312, 316 of the first transaction. An exemplary coherence GETM write request comprises a request for an exclusive data block write. The coherence controller 108, 110 in an example identifies a conflict with a transaction impacted by OS virtualization actions when the address stored to by its thread is present in the read set 316 of its summary signature 306, or the address loaded or stored by a thread is present in its write set 318.

An illustrative description of LogTM-SE is presented below with reference to MOESI protocol, for explanatory purposes. The MOESI protocol comprises a full cache coherency protocol that serves to encompass all of the possible states commonly used in other protocols. Each cache line is in one of five states: M—Modified, O—Owned, E—Exclusive, S—Shared, or I—Invalid. In the Modified (M) state, a cache line comprises a most recent, correct copy of the data. The copy in main memory 117 is stale (incorrect), and no other processor holds a copy.

In the Owned (O) state, a cache line comprises the most recent, correct copy of the data. Other processors 126, 128 can hold a copy of the most recent, correct data. The copy in main memory 117 can be stale (incorrect). Only one processor 126, 128 can hold the data in the owned state. A processor 126, 128 in an example retains the right to modify a shared cache line 118, 120 by promising to share any writes it performs with the other caches 112, 114, 120.

In the Exclusive (E) state in an example a cache line 118, 120 comprises the most recent, correct copy of the data. The copy in main memory 117 is also the most recent, correct copy of the data. No other cache 112, 114, 116 holds a copy of the data. In the Shared (S) state, a cache line comprises the most recent, correct copy of the data. Other caches 112, 114, 116 in the system 100 may also hold copies of the data. The copy in main memory 117 is also the most recent, correct copy of the data, if no other cache 112, 114, 116 holds it in owned state. In the Invalid (I) state, a cache line does not hold a valid copy of the data. Valid copies of the data can be either in main memory 117 or another processor cache such as one or more additional instances of first level memory 112, 114 associated with one or more other instances of the core 104, 106.

When executing transactions that have not been virtualized, the coherence controller 108, 110 prevents a core's L1 cache 112 from caching a block (no M, O, E, or S coherence states) that is in the write-set 310, 314, 318 of a transaction on another core 106. LogTM-SE in an example prevents the cache controller 118 of a core's L1 cache from exclusively caching a block (no M or E) that is in the read-set of a transaction on another core 106. A core 104, 106 may cache data that is in the read-set or write-set signature 302, 304, 306 of another core 104, 106, but not the read-set or write-set of a transaction on another core, due to aliasing in the signature hash functions. Isolation is promoted by ensuring that data written by one transaction cannot be read or written by others before commit. On single-threaded cores, loads that hit in the core's L1 cache 112, 114 (states M, O, E, or S) and stores that hit (M or E) need no signature tests. LogTM-SE in an example does not enforce the converse of the above-listed constraints. For example, a block in a transaction's read-set 308, 312, 316 or write-set 310, 314, 318 need not be locally cached.

Each of the coherence requests in an example includes an address space identifier 352 (FIG. 3). The coherence controller 108, 110 promotes avoidance of occurrence of the false positives for the conflicts through negative acknowledgement of a coherence request only if a signature indicates: a potential conflict; and a determination of a match between the address space identifier 352 of the coherence request and an address space identifier 352 of any of the transactions running on a receiving core 104, 106 that is associated with the coherence request. The coherence controller 108, 110 and the receiving core 104, 106 are integrated or distinct.

Signatures 302, 304, 306 have a potential to cause interference between memory references in different processes. Hypothetically, if thread ta 328 in process A running on the core 104 accesses a memory block residing on core 106, which is running thread tb 170 from process B, a signature on the core 106 may signal a false conflict. While not affecting correctness, this interference could allow one process to prevent all other processes from making progress. LogTM-SE prevents this situation by adding an address space identifier 352 to all coherence requests. Threads 328, 502, 170 in the same process use the same address space identifier 352, and the OS 124 assigns each process a unique identifier. The identifiers can be simple numbers or hierarchical identifiers representing more complicated relationships, such as parent/child. Requests are negatively acknowledged (NACKed) only if the signature 302, 304, 306 signals a potential conflict and the address space identifiers 352 match, preventing false conflicts between processes.

The coherence controller 108 may comprise additional mechanisms to detect conflicts among threads 328, 330, 332 on the same multi-threaded core as the core 104. Each thread context represented by each respective set 322, 324, 326 maintains its own read and write signatures 302, 304, 306. Loads or stores to blocks in an L1 cache 112, 114 shared among threads 328, 330, 332, 170, 172, 174 query the signatures 302, 304, 306 of other threads on the same core 104, 106. An exemplary implementation detects conflicts only before the memory instruction commits.

Before checking the signatures 302, 304, 306 for conflicts, the coherence controller 108, 110 makes the determination of the match between the address space identifier 352, 354, 356 of the coherence request and the address space identifier 352, 354, 356 of any of the transactions running on the receiving core 104, 106 based on one or more of: a preselected extent of similarity between the address space identifier 352, 354, 356 of the coherence request and the address space identifier 352, 354, 356 of any of the transactions running on the receiving core 104, 106; and/or a preselected hierarchical relationship between the address space identifier 352, 354, 356 of the coherence request and the address space identifier 352, 354, 356 of any of the transactions running on the receiving core 104, 106.

The address space identifier 352, 354, 356 identifies threads that may access common memory. A match between two or more address space identifiers 352, 354, 356 indicates that it is possible that the threads could access the same memory, while non-matching address space identifiers 352, 354, 356 between two threads indicate that that the threads cannot access the same memory. The address space identifiers 352, 354, 356 are assigned by the operating system 124. The coherence controller 108 stores and checks an address space identifier 352, 354, 356 for each thread 328, 330 running on its associated processor 126. Each thread 328, 330, 332 on a multithreaded core 104 has its own address space identifier 352, 354, 356, respectively.

For example, the coherence controller 108, 110 makes the determination of the match between the address space identifier 352, 354, 356 of the coherence request and the address space identifier 352, 354, 356 of any of the transactions running on the receiving core 104, 106 based on one or more of: a preselected degree of equality between the address space identifier 352, 354, 356 of the coherence request and the address space identifier 352, 354, 356 of any of the transactions running on the receiving core 104, 106; a preselected threshold of equivalence between the address space identifier 352, 354, 356 of the coherence request and the address space identifier 352, 354, 356 of any of the transactions running on the receiving core 104, 106; and/or a preselected hierarchical relationship between the address space identifier 352, 354, 356 of the coherence request and the address space identifier 352, 354, 356 of any of the transactions running on the receiving core 104, 106.

LogTM-SE in an example employs eager version management. LogTM-SE may be appreciated to adopt LogTM's per-thread log 401 and add a mechanism, for example, the log filter 210 of the processor 126, to suppress redundant logging. As may be appreciated to be like a Pthread's stack, the log 401 is allocated per thread in virtual memory. Before a memory block is first written in a transaction, its virtual address and previous contents are written to an undo entry 408, 410, 412, 414, 416 of the log 401. LogTM-SE avoids logging the same block twice by maintaining an array of recently logged blocks for each thread context, called the log filter 210, as part of the processor 126. Before copying a block to its log 401, the processor 126 checks whether the block address is in its log filter 210. If so, it does nothing. If it is not in the log filter 210, the processor 126 logs the block and adds its address to the log filter 210. As a result, recently logged addresses will not be logged again because they are listed in the log filter 210. The log filter 210 may be implemented as an array and/or be fully associative, set associative, or direct mapped. For example, the log filter 210 may employ any and/or a selected replacement algorithm. The log filters 210 are logically per-thread and can be implemented in a tagged shared structure. The log filter 210 in an example stores virtual addresses and is a performance optimization not required for correctness, so it is safe to clear the log filter 210 (e.g., on context switch).

The coherence controllers 108, 110 employ a function to compute their signatures 302, 304, 306. The function in an example is variable at run time and variable for each of the coherence controllers 108, 110. The variability of the function at run time contrasts with a function fixed at the time of manufacture.

The processor 126 in an example saves a checkpoint 212 of registers and signatures such as the physical signature 302 and the virtual signature 304 of a parent memory transaction at a time when a child or nested memory transaction begins or is forked from the parent memory transaction. The checkpoint 212 of registers and the signatures 302, 304 of the parent memory transaction are restorable by the processor 126.

A coherence controller 108, 110 in hardware employs signatures 306 that summarize read sets 316 and write sets 318 of transactions to allow transactional threads 328, 502, 170 to employ the coherence controller 108, 110 to update a memory location in place to an updated value after saving a previous value for the memory location in a per-thread memory log 401. The memory location is updated in the memory 107. The update may occur in the first level cache memories 112, 114, the second level cache memory 116, or the main memory 117. The update in an example may occur in the first level cache 112. In another example, the update may occur in the second level cache memory 116 or the main memory 117 such as with write-through caches or non-cached writes, as will be appreciated by those skilled in the art.

The OS 124 or other software 150 in the main memory 117 in an example allocates a log 401 for each thread 328, 502, 170 in a process in virtual memory. The processor core 104 writes a virtual address and the previous value of the memory location to the log 401 as an undo entry 408, 410, 412, 141, 416 before the coherence controller 108, 110 would write the updated value to the memory location in a transaction. The processor 126 employs an indication of recently logged blocks for each thread context as a log filter 210 as an indication whether the updated value has already been written to the memory location.

In connection with the log filter 210, if a transaction writes to the same memory location twice, an exemplary implementation need not write the old value to the log again. The log filter 210, 211 indicates whether a thread 328, 330, 332, 170, 172, 174 has already written to the location. An exemplary implementation of the log filter 210 as a content addressable memory cache ensures no false positives though may have false negatives. The log filter 210 in an example may allow logging the same address twice but will never fail to log an address once.

The size of the previous value of the memory location written to the log 401 by the coherence controller 108, 110 can range from the actual size of corresponding data to a largest memory block size recognized by the coherence controller 108, 110. The size of the old value written could be as small as the actual size of the data stored by the program instruction up to the largest memory block size recognized by the coherence controller 108, 110, such as a cache block. The log filter 210 operates on the memory size logged.

The coherence controller 108, 110 commits a transaction locally by: resetting a log pointer 432 to a log 401 to its base from the log frame register 216; and clearing the physical signature 302 and the virtual signature 304. When a transaction begins, the processor 126 creates the register checkpoint 212 and saves the contents of the user registers 202 to the register checkpoint 212. In addition, depending on the processor architecture, privileged registers that refer to program state may also be saved in the checkpoint 212. The coherence controller 108, 110 copies the checkpoint 212 to the transaction header 404 in the log 401 asynchronously.

A closed nested commit merges the current log frame 402, 403 with its parent's frame. The processor 126 sets the frame pointer 430 back to the parent's frame, for example, using the value saved at transaction begin in the committing transaction's frame. The committed transaction's header 404 remains in the body of the parent as a garbage header. The garbage headers occupy space in the parent's frame 402, 402 though in an exemplary implementation have no semantic value.

The coherence controller 108, 110 aborts a transaction by trapping to a software handler in the contention manager 122 that locally undoes a per-thread log 401 for the transaction in memory 107. The software abort handler located at the handler address 208, 209 walks through the log 401 to restore transactionally modified memory locations; restores a checkpoint 212 for user registers 202 of a processor 126, 128 associated with the transaction; and clears signatures 302 and 304. The contention manager 122 in an example may support an entire computer system 102. In another example, a plurality of contention managers 122 may support a corresponding and/or respective plurality of threads 328, 330, 332, 170, 172, 174.

The coherence controller 108, 110 and the processor 126, 128 are integrated or distinct. A variety of different processor implementations are employable. The coherence controller 108 in an example employs a software handler located at the handler address 208 in the main memory 117 to implement abort, for example, as an uncommon case. A thread 328, 502, 170 aborts a transaction by trapping to an abort handler located at the abort handler address 208. For example, the abort handler walks the log 401 in LIFO (last-in, first-out) order to restore transactionally modified blocks to the memory 107, which may go to first level caches 112, 114, second level cache 116, or main memory 117. Once the first memory is restored to pre-transaction values, the handler located at the handler address 208 releases isolation by clearing the thread's physical signature 302. The virtual signature 304 is also reset, but the summary signature 306 is not, because the summary signature 306 refers to other, still executing, transactions. The handler located at the handler address 208 then provides instructions to the processor 126 to copy register values from the register checkpoint 212 into the user registers 202. Although the abort operation in an example takes time proportional to the number of blocks written by a transaction, it does not require any global resources.

In an exemplary implementation, an abort of a nested transaction at level J traps to a software handler that walks the body of J's log frame 402 backwards to process undo records 408, 410, 412 and skip garbage headers, finally restoring the register state saved in the header 404. A transaction abort through a level M ancestor of the current transaction level J has the software handler in the contention manager 122 undo J−M+1 log frames 402, 403.

A software-loadable data structure comprises a signature 302, 304, 306 that restricts where the processor 126, 128 can load or store. The OS 124 or other software 150 in the main memory 117 can load values into these signatures 302, 304, 306. A coherence controller 108, 110 in hardware detects conflicts on load and store instructions through employment of signatures 302, 304, 306 that summarize a set of addresses where the coherence controller 108, 110 cannot load and a set of addresses where the coherence controller 108, 110 cannot store. The signatures 302, 304, 306 comprise fixed-size representations of a substantially arbitrary set of addresses.

A coherence controller 108, 110 in hardware detects conflicts on load and store instructions through employment of signatures 302, 304, 306 that summarize read-sets 308, 312, 316 and write-sets 310, 314, 318 of transactions; and summarize a subset of addresses unavailable for loading and a subset of addresses unavailable for storage. The signatures comprise fixed-size representations of a substantially arbitrary superset of addresses that comprises the subset of addresses unavailable for loading and the subset of addresses unavailable for storage.

The signatures 302, 304, 306 are loadable from memory 107 by software 124, 150 and storable to the memory 107 by the software 124, 150. The signatures 302, 304, 306 in an example may be stored as data for the OS 124 or elsewhere in the main memory 117. The software-accessible signatures 302, 304, 306 are savable to and restorable from the log 401 by software 124, 150.

Software in the OS 124 or elsewhere in the main memory 117 identifies the subset of addresses unavailable for loading in a transaction from a union of the write-sets 310, 314, 318 of a remainder of the transactions. Software in the OS 124 or elsewhere identifies the subset of addresses unavailable for storage in the transaction from a union of the read-set 308, 312, 316 and the write-set 310, 314, 318 of the transaction. The coherence controller 108, 110 prevents transactions from writing to addresses identified from the union (logical OR) of the read-set 308, 312, 316 and the write-set 310, 314, 318. The coherence controller 108, 110 prevents transactions from reading from addresses identified from the union of the write-sets 310, 314, 318 of other transactions.

Software in the OS 124 or elsewhere creates a summary signature 306 from a union of software-accessible signatures 302, 304 that are associated with threads 328, 502, 170 affected by context switching and/or memory virtualization. The summary signature 306 of a thread 328, 502, 170 is constructed by saving the software accessible signatures 302, 304 of threads affected by context switching or memory virtualization, and then taking the union of those saved signatures 302, 304. An exemplary signature 304 built from virtual addresses may be immune from paging and swapped to the main memory 117. Support of context switching and paging by copying signatures 302, 304, and constructing summary signatures 306 serves to effect virtualized transactional memory. The coherence controller 108, 110 computes the signatures 302, 304 and the summary signature 306 from virtual addresses.

LogTM-SE adds to each thread context on a processor 126 a register checkpoint 212, and a log pointer 206 to locate the end of the log 401 in memory 107, a log frame pointer 216 to indicate the base of the current log frame 402, 403, the abort handler address 208, the log filter 210, and a transaction status flag 214. In addition, the coherence controller 108 stores for each thread: the physical signature 302, the virtual signature 304, the summary signature 306, and the address space identifier 352. The log frame 402 is the first record of the frame. The log pointer 432, 206 is the end of the log 401, where the next record should be written. On abort, the log frame 432, 216 is copied to the log pointer 432, 206.

An illustrative description of exemplary virtualization in an implementation of the apparatus 100 is presented, for explanatory purposes.

An exemplary implementation employs LogTM-SE to execute transactions unbounded in size and nesting depth through employment of limited hardware. LogTM-SE's version management is naturally unbounded, since logs 401 are mapped per-thread into virtual memory. LogTM-SE's signatures 302, 304, 306 and logs 401 are software accessible, allowing software, such as the operating system 124 or a transaction management package as the software 150, to save and restore signatures to/from the log 401.

Upon eviction of a cache block from the first level memory 112 the coherence controller 108, 110 refrains from changing directory memory state 130 of a directory in the memory 107 so the directory continues to forward coherence requests to the coherence controller 108, 110 for detection of the conflicts through the direct, non-broadcast employment of the signatures 306 that summarize the read-sets 316 and the write-sets 318 of the transactions.

In cache victimization, caches 112, 114, 116 may need to evict transactional blocks when a transaction's data size exceeds cache capacity or associativity. Multi-threaded cores 104, 106 make this more likely and unpredictable, due to interference between threads 328, 502, 170 sharing the same L1 cache 112, 114. After eviction, an exemplary HTM continues to efficiently handle both version management and conflict detection.

In an exemplary implementation, cache victimization has no effect on LogTM-SE's version management. Both new values (in place) and old values (in the log) may be victimized, for example, without resorting to special buffers. LogTM-SE's mechanism for conflict detection depends upon the underlying cache coherence protocol. With eager conflict detection, LogTM-SE relies on the coherence protocol to direct requests to all caches that might represent a conflict. With broadcast coherence, cache victimization has no effect on conflict detection, because LogTM-SE can check all signatures on every broadcast.

With a naive directory protocol, cache victimization could lead LogTM-SE to miss some signature checks and hence miss some conflicts. LogTM-SE avoids this case by extending the directory protocol to use LogTM's sticky states. LogTM-SE's caches silently replace blocks in states E and S and write back blocks in states M and O. When evicting a cache block (e.g., the core 104 replaces block B in the first level memory 112), however, LogTM-SE does not change the directory state 130, so that the directory with the directory memory state 130 continues to forward conflicting requests to the evicting core (e.g., a conflicting operation by the core 106 is still forwarded to the core 104, which checks its signature). So, LogTM-SE allows transactions to overflow the cache as the first level memory 112, for example, without a loss in performance.

LogTM-SE supports unbounded transactional nesting with no additional hardware by virtualizing the state of the parent's transaction while a child transaction is executing. LogTM-SE segments a thread's log 401 into a stack of frames 402, 403 that each comprise a fixed-sized header (e.g., register checkpoint 212) and a variable-sized body of undo records such as the undo entries 408, 410, 412, 414, 416 of the log 401. LogTM-SE augments the header 404 with a fixed-sized signature-save area as the snapshots 426, 428.

A nested transaction begins by saving the current thread state in the snapshots 426, 428. The processor 126 allocates a new header 404 with a register checkpoint 212 and copies the physical signature 302 and virtual signature 304 to the frame header 404. To ensure the child correctly logs all blocks memory 107 in an example the coherence controller 108 clears the log filter 210.

Loads and stores within the child transaction behave correctly, appropriately adding to the physical signature 302, the virtual signature 304 (if present) and log 401. On commit of a closed nested transaction, the processor 126 merges the inner transaction with its parent by discarding the inner transaction's header 404 and restoring the parent's log frame 402. An open nested commit behaves similarly, except the coherence controller 108 employs LogTM-SE to first restore the physical signature 304 from the frame header 404 into the (hardware) physical signature 302 to release isolation on blocks of the first level cache memory 112, the second level cache memory 116, and the main memory 117 accessed by only the committing open transaction. If virtual signatures are present, LogTM-SE also restores them from the log 401.

On an abort, LogTM-SE's software handler located at the handler address 208 first unrolls the child transaction's log frame 402, 403 and restores the parent's physical and virtual (if present) signatures 302, 304. If this resolves the conflict, the partial abort is done and a retry can begin. If a conflict remains with the parent's physical signature 302, the handler located at the abort handler address 208 repeats this process until the conflict disappears or it aborts the outer-most transaction.

The coherence controller 108 employs LogTM-SE to support unbounded transactional nesting with a per-thread hardware signature 302, saved to the log 401 on nested begins. To reduce overhead, each thread context could provide hardware to store more than one physical signature 302 to avoid synchronously saving and restoring signatures to the log 401. On a nested begin, for example, the coherence controller 108 copies the current signature S to Sbackup. Inner commit of a closed transaction discards Sbackup, while inner commit of an open transaction and all inner aborts restore Sbackup to S. This avoids the cost of copying a signature 302, 304, 306 to and from memory when nested transactions begin and end. Like register windows, the benefit of this extra hardware in an example depends on program behavior.

An illustrative description of exemplary context switching and paging in an implementation of the apparatus 100 is presented, for explanatory purposes.

The coherence controller 108 employs LogTM-SE to allow threads executing in transactions to be suspended and rescheduled on other thread contexts and to relocate in memory 112, 114, 116, 117, pages accessed within a transaction.

An exemplary implementation performs context switching and paging. LogTM-SE supports operating system actions to virtualize hardware. The OS 124 may provide application programmers with a high-level abstraction of processors 126, 128 and memory 107 by virtualizing physical resource constraints, such as memory size and processor speed, using mechanisms such as paging and context switching. To present application programmers an abstraction of transactional memory, an exemplary OS (1) ensures that transactions execute correctly when it virtualizes the processor or memory, and (2) virtualizes the HTM's physical resource limits. Exemplary hardware and low-level software mechanisms in an example are fast in common cases, correct in all cases, and relatively simple.

All of a thread's transactional state such as its version management and conflict detection state in an example may be accessible to the OS 124. Both old and new versions of transactional data in an example reside in virtual memory and require no special OS support. A log filter 210 may or may not present. The log filter 210, where present in an exemplary implementation, may be cleared when a thread 328, 330, 332, 502, 170 is descheduled.

A thread's conflict detection state can be saved by copying the read/write signatures to the log 401. The coherence controller 108 continues to track conflicts with the suspended thread's signatures to prevent other threads from accessing uncommitted data using summary signatures 306. For example, another thread in the same process may begin a transaction on the same thread context and try to read a block in its local cache 112, 114. The coherence controller 108 checks this access to ensure that the block is not in the write-set of a descheduled transaction. The coherence controller 108 in an example serves to ensure that all active threads check the signatures of descheduled threads in their process on every memory reference. The OS 124 in an example makes all the hardware resources of the thread's old processor 126, 128 available to a new thread. LogTM-SE employs a summary signature 306, which represents the union of the read- and write-sets of suspended transactions. The OS 124 maintains the invariant that the summary signature 306 for a running thread t in process P contains the read and write sets of all other threads with virtualized transactions from P at the time their last suspension.

On every memory reference, including hits in the local cache both transactional and non-transactional in an exemplary implementation, the coherence controller 108 checks the summary signature 306 to ensure that the request does not conflict with a descheduled transaction. A summary signature 306 per thread context may be employed with multi-threaded cores as the cores 104, 106 where each thread on a core may belong to a separate process.

The OS 124 may maintain in software a summary signature for each thread in the process. When descheduling a thread, the OS 124 in an example saves the thread's current physical signature 302, and virtual signature 304 if present. The OS 124 merges the thread's saved physical signature 302, or virtual signature 304 if present, into the summary signature 306 for all other threads. The OS 124 may interrupt all other thread contexts running threads from the process and install the new summary signature 306.

When the OS 124 reschedules a thread, it copies the thread's saved signatures 302, 304 into the hardware read/write signatures 302, 304. The summary signature 306 of other threads is not recomputed in an example until the thread commits its transaction. This ensures that its read and write sets 308, 310 remain isolated after thread migration. The thread executes with a summary signature 306 that does not include its own signatures 302, 304 to prevent conflicts with its own read- and write-sets 308, 310. After the transaction commits, the OS 124 computes new summary signatures 306 for all other threads and loads the new summary signature 306 for running threads. The OS 124 may delay or immediately perform this such as with interprocessor interrupts when a virtualized transaction commits.

An example of LogTM-SE with two running threads and a suspended thread in a transaction is presented with reference to FIG. 1. Thread 502 was running on the core 104 and was suspended by the OS 124. Its virtual signature was then copied into the summary signature 306 for thread 170 on the core 106 as well as into the summary signature 306 for thread 328 on the core 104. When the thread 170 tries to access memory location 0x10 in the memory 107, the thread 170 employs the coherence controller 106 to first consult the summary signature 306 for the thread 170 to check for a conflict. If thread 502 had previous accessed location 0x10, a conflict would be detected here and the core 104 would trap into the OS 124, which could invoke a software contention manager 122. If LogTM-SE detects no conflict, the core 106 can send a coherence request to the core 104, which will employ the coherence controller 104 to check the physical signature 302 of the thread 328 for conflicts. If no conflict is detected, the core 104 will return the data at location 0x10.

LogTM-SE supports paging by virtualizing the transactions impacted by paging. When the OS 124 relocates a page in memory that was previously accessed by a running transaction, the OS 124 first identifies which transactions could have accessed the page within a transaction, for example by comparing the time at which the page was last accessed to the start time of a transaction. If virtual signatures 304 are present, then the OS 124 in an example virtualizes these transactions by saving their virtual signatures 304 to memory 107, computing new summary signatures 306 for all threads, and sending interprocessor interrupts to running threads in the process to load the new summary signatures 306. The summary signatures 306, which in an example are computed from virtual addresses in this case, isolate transactional data on the page at its new virtual address in the memory 107. If virtual signatures are not present, the OS 124 in an example again identifies transactions affected by paging, and then identifies which blocks on the page could have been accessed by those transactions. For every thread in the process, the OS 124 in an example tests every block on the remapped page against the thread's physical signature 302, either in memory 107 such as for suspended threads, or against the hardware physical signature 302. If the memory block is present in the physical signature 302, the OS 124 records the address of the corresponding block of the page's new physical address in memory 107. The OS 124 may compute new summary signatures 306 for all threads with the updated physical addresses in memory 107.

The OS 124 in an example need not update summary signatures 306 synchronously in all cases. When a virtualized transaction completes, the summary signatures 306 can be left unchanged until the coherence controller 108 in hardware detects a conflict, since only false positives as detection of conflicts that do not exist in an example may occur. The coherence controller 108 in an example need not detect conflicts for pages that have not been mapped into virtual memory, as virtual memory hardware in an example protects the data on a relocated page until the page mapping is entered in a buffer such as a TLB (translation lookaside buffer) for a processor 126, 128. The OS 124 in an example may delay installing a new summary signature 306 for a running thread until it adds the page to the TLB or page table when a thread accesses the relocated page.

When a thread conflicts with its summary signature 306, the coherence controller 108, 110 traps to a handler in the contention manager 122 at the handler address 208, 209 or the OS 124 to resolve the conflict. The processor 126, 128 in an example sets a bit in the transaction status 214 to indicate the cause of the trap. The OS 124 may detect whether the thread's summary signature 306 is out of date, reloads the summary signature 306 if needed, and restarts the thread. If the thread's summary signature 306 is already up to date, then the trap may be passed to a user-mode contention manager as the contention manager 122 to resolve the conflict. The contention manager 122 may abort the current transaction, signal another transaction to abort, or queue the current transaction behind another.

An implementation of the apparatus 100 comprises a plurality of components such as one or more of electronic components, chemical components, organic components, mechanical components, hardware components, optical components, and/or computer software components. A number of such components can be combined or divided in an implementation of the apparatus 100. In one or more exemplary implementations, one or more features described herein in connection with one or more components and/or one or more parts thereof are applicable and/or extendible analogously to one or more other instances of the particular component and/or other components in the apparatus 100. In one or more exemplary implementations, one or more features described herein in connection with one or more components and/or one or more parts thereof may be omitted from or modified in one or more other instances of the particular component and/or other components in the apparatus 100. An exemplary technical effect is one or more exemplary and/or desirable functions, approaches, and/or procedures. An exemplary component of an implementation of the apparatus 100 employs and/or comprises a set and/or series of computer instructions written in or implemented with any of a number of programming languages, as will be appreciated by those skilled in the art.

An implementation of the apparatus 100 encompasses an article and/or an article of manufacture. The article comprises one or more computer-readable signal-bearing media. The article comprises means in the one or more media for one or more exemplary and/or desirable functions, approaches, and/or procedures.

An implementation of the apparatus 100 employs one or more computer readable signal bearing media. A computer-readable signal-bearing medium stores software, firmware and/or assembly language for performing one or more portions of one or more implementations. An example of a computer-readable signal bearing medium for an implementation of the apparatus 100 comprises a memory and/or recordable data storage medium of the first level cache memories 112, 114, the second level cache memory 116, the main memory 117, and/or the memory 107. A computer-readable signal-bearing medium for an implementation of the apparatus 100 in an example comprises one or more of a magnetic, electrical, optical, biological, chemical, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network. A computer-readable signal-bearing medium in an example comprises a physical computer medium and/or computer-readable signal-bearing tangible medium.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a first core that includes:
a processor executing one or more threads, wherein the threads execute one or more memory transactions;
a cache associated with the processor that stores data operated on by the memory transactions; and
a coherence controller in hardware that computes one or more signatures summarizing read-sets and write sets of the memory transactions performed with respect to the cache, receives a coherence request from a second core different from the first core, and detects a conflict to the data stored in the cache for the coherence request based on the computed signatures,
wherein the coherence request does not include any signatures computed by the second core, and
wherein the signatures provide false positives but no false negatives for the conflict on the coherence request,
wherein the signatures comprise fixed-size representations of a substantially arbitrary set of addresses for the read-sets and the write-sets of the memory transactions, and
wherein the processor is associated with the coherence controller.

2. The apparatus of claim 1, wherein the signatures comprise hash functions as probabilistic data structures;
   wherein the coherence controller detects the conflict on the coherence request through direct, non-broadcast employment of the hash functions.

3. The apparatus of claim 1, wherein a load or store that misses to a memory block of the second core, in a cache unshared with one or more processors beyond the processor associated with the coherence controller, generates the coherence request,
   wherein the coherence controller receives the coherence request and checks the signatures for the conflict,
   wherein, upon a determination of the conflict, the coherence controller provides an indication of the conflict that is employable by conflict resolution logic,
   wherein the coherence controller and the conflict resolution logic are integrated or distinct.

4. The apparatus of claim 1,
   wherein the processor checks the signatures and relies on a coherence protocol for the cache to direct the coherence requests to all caches that are potentially subject to the conflicts for the coherence requests.

5. The apparatus of claim 1,
   wherein the memory transactions comprise first and second memory transactions,
   wherein the signatures comprise first and second signatures that comprise corresponding read-sets and write-sets of the first and second memory transactions, and
   wherein the coherence controller identifies the conflict based on one or more of arrival at the coherence controller of any one of the coherence requests from the second memory transaction that is in the write-set of the first memory transaction and arrival at the coherence controller of the coherence request from the second memory transaction that is in the read-set of the first memory transaction.

6. The apparatus of claim 1,
   wherein the coherence request comprises an address space identifier,
   wherein the coherence controller promotes avoidance of occurrence of the false positives for the conflict through negative acknowledgement of the coherence request, only if a signature of the signatures indicates:
      a potential conflict; and
      a determination of a match between the address space identifier of the coherence request and an address space identifier of the one or more threads executed by the processor associated with the coherence controller.

7. The apparatus of claim 6, wherein the coherence controller employs the signature to make the determination of the match between the address space identifier of the coherence request and the address space identifier of the one or more threads executed by the processor associated with the coherence controller based on one or more of a preselected extent of similarity between the address space identifier of the coherence request and the address space identifier of the one or more threads executed by the processor associated with the coherence controller and a preselected hierarchical relationship between the address space identifier of the coherence request and the address space identifier of the one or more threads executed by the processor associated with the coherence controller.

8. The apparatus of claim 6,
   wherein the one or more threads comprise a plurality of threads executed by the processor associated with the coherence controller, wherein for each thread context for each of the plurality of threads, the coherence controller maintains one or more corresponding signatures,
   wherein the coherence controller and the processor are integrated or distinct,
   wherein loads or stores to memory blocks by each of the plurality of threads cause the coherence controller to query the signatures for the corresponding read-sets and write-sets of the memory transactions of all other of the plurality of threads with matching address space identifiers.

9. The apparatus of claim 1, wherein the signatures are loadable from memory by software and storable to the memory by the software.

10. The apparatus of claim 1, wherein, upon eviction of a cache block, the coherence controller refrains from changing a state of a directory so the directory continues to forward coherence requests to the coherence controller for detection of the conflicts through direct, non-broadcast employment of the signatures that summarize the read-sets and the write-sets of the memory transactions.

11. The apparatus of claim 1,
   wherein the coherence controller comprises a first coherence controller,
   wherein the signatures comprise first signatures,
   wherein the apparatus further comprising a second coherence controller;
   wherein the first and second coherence controllers employ a function to compute the first signatures and second signatures, respectively,
   wherein the function is variable at run time and variable for each of the first and second coherence controllers.

12. The apparatus of claim 1, wherein the processor saves a checkpoint of registers and the signatures of a parent memory transaction of the memory transactions at a time when a child memory transaction of the memory transactions begins,
   wherein the checkpoint of the registers and the signatures of the parent memory transaction are restorable by the processor.

13. The apparatus of claim 1,
   wherein the threads comprise transaction threads,
   wherein the coherence controller performs direct, non-broadcast employment of signatures to allow the transactional threads to employ the coherence controller to update a memory location in place to an updated value after saving a previous value for the memory location in a per-thread memory log.

14. The apparatus of claim 13,
   wherein software allocates a log for each thread in a process in virtual memory
   wherein the processor writes a virtual address and the previous value of the memory location to the log before the processor would write the updated value to the memory location in a memory transaction of the memory transactions;
   wherein the processor employs an indication of recently logged blocks for each thread context as a log filter so as to indicate whether the updated value has already been written to the memory location.

15. The apparatus of claim 14, wherein a size of the previous value of the memory location written to the log by the processor can range from an actual size of corresponding data to a largest memory block size recognized by the processor.

16. The apparatus of claim 13, wherein the processor commits a memory transaction, of the memory transactions, locally by clearing signatures, of the signatures, that summarize a read set and a write set for the memory transaction and resetting a log pointer to a log to a base for the memory transaction.

17. The apparatus of claim 13, wherein the processor that aborts a memory transaction of the memory transactions by trapping to software that locally undoes a log for the memory transaction in thread-private memory as a walk through the log to restore transactionally modified memory locations, restores a checkpoint for user registers of a processor associated with the memory transaction, and clears signatures of the signatures that summarize a read set and a write set for the memory transaction,
    wherein the coherence controller and the processor are integrated or distinct.

18. An apparatus, comprising:
    a processor executing one or more threads, wherein the threads execute load and store instructions;
    a cache associated with the processor that stores data accessible by the memory transactions; and
    a coherence controller in hardware that computes one or more signatures summarizing read-sets and write sets of memory transactions and detects a conflict to the data stored in the cache for the load and store instructions based on the computed signatures,
    wherein one or more of the load and store instructions are identified in the coherence request from a processor that is not associated with the cache,
    wherein the coherence request does not include any signatures, and
    wherein the signatures summarize read-sets and write-sets of memory transactions,
    wherein the signatures further summarize a subset of addresses unavailable for loading and a subset of addresses unavailable for storage, and
    wherein the signatures comprise fixed-size representations of a substantially arbitrary superset of addresses that comprises the subset of addresses unavailable for loading and the subset of addresses unavailable for storage.

19. The apparatus of claim 18, wherein the signatures are loadable from memory by software and storable to the memory by the software.

20. The apparatus of claim 18, further comprising software that identifies the subset of addresses unavailable for loading in a memory transaction of the memory transactions from a union of the write-sets of a remainder of the memory transactions,
    wherein the software identifies the subset of addresses unavailable for storage in the memory transaction from a union of the read-set and the write-set of the memory transaction.

21. The apparatus of claim 18, further comprising software, wherein the coherence controller or the software creates a summary signature from a union of software-accessible signatures included within the signatures that are associated with threads affected by one or more of context switching and memory virtualization.

22. The apparatus of claim 21, wherein the coherence controller computes the signatures and the summary signature from virtual addresses.

* * * * *